(12) United States Patent
Smith (10) Patent No.: US 8,857,832 B2
(45) Date of Patent: Oct. 14, 2014

(54) KNEE-WALKER

(71) Applicant: Paul Smith, Paignton (GB)

(72) Inventor: Paul Smith, Paignton (GB)

( * ) Notice: Subject to any disclaimer, the term of this patent is extended or adjusted under 35 U.S.C. 154(b) by 0 days.

(21) Appl. No.: 13/645,048

(22) Filed: Oct. 4, 2012

(65) Prior Publication Data

US 2014/0097592 A1    Apr. 10, 2014

(51) Int. Cl.
*B62M 1/00* (2010.01)

(52) U.S. Cl.
USPC .............. 280/87.05; 280/87.041; 280/87.043; 280/263; 280/87.021; 280/87.01

(58) Field of Classification Search
USPC ......... 280/87.05, 87.021, 87.01, 263, 87.041, 280/87.043, 87.045
See application file for complete search history.

(56) References Cited

U.S. PATENT DOCUMENTS

| 692,725 | A | | 2/1902 | Simmons | |
|---|---|---|---|---|---|
| 4,068,857 | A | | 1/1978 | Karlsson | |
| 4,867,188 | A | | 9/1989 | Reid | |
| 5,174,593 | A | * | 12/1992 | Chapman | .................... 280/47.11 |
| 5,411,035 | A | | 5/1995 | Stone | |
| 5,492,353 | A | * | 2/1996 | Chapman | .................... 280/47.11 |
| 5,800,317 | A | | 9/1998 | Accetta | |
| 5,951,817 | A | * | 9/1999 | Thomas | ......................... 156/472 |
| 7,311,319 | B1 | | 12/2007 | Ortega | |
| 7,416,060 | B2 | * | 8/2008 | Takizawa | ................. 188/218 XL |
| 7,780,180 | B2 | * | 8/2010 | Hoepner et al. | .............. 280/267 |
| 7,976,049 | B2 | | 7/2011 | Chiu | |
| 7,980,572 | B2 | | 7/2011 | Bennett | |
| 2004/0195794 | A1 | | 10/2004 | Fan | |
| 2006/0033297 | A1 | | 2/2006 | Miller | |
| 2007/0182116 | A1 | | 8/2007 | Davey et al. | |
| 2009/0058037 | A1 | * | 3/2009 | Accetta | ......................... 280/267 |
| 2011/0109058 | A1 | | 5/2011 | Janis et al. | |
| 2012/0280467 | A1 | * | 11/2012 | Walther et al. | ................. 280/263 |

FOREIGN PATENT DOCUMENTS

JP      404071554 A    3/1992
WO    2007065174 A2    7/2007

* cited by examiner

*Primary Examiner* — Joseph M Rocca
*Assistant Examiner* — Marlon Arce
(74) *Attorney, Agent, or Firm* — Carl M. Napolitano; GrayRobinson, P.A.

(57) ABSTRACT

Knee-walkers allow amputees and individuals with injuries to maintain independent movement. Their stability and steering is very important. The invention comprises a knee-walker (10) comprising a frame (20), at least two ground-engaging wheels (50) at the front, a seat (90), a steering column (70), and a steering belt (200) linking the steering column to the two front wheels, the two front wheels being steered by rotation of the steering column and consequent rotation of the belt.

16 Claims, 6 Drawing Sheets

KNEE-WALKER

FIELD OF THE INVENTION

The present invention relates generally to a knee-walker and finds particular, although not exclusive, utility in supporting the leg of an individual during convalescence.

BACKGROUND OF THE INVENTION

In situations where an individual has damaged, or had a surgical procedure on, an ankle or foot it is preferred medically to keep weight off the foot or ankle while recuperating. Traditionally, this has been achieved by the use of wheelchairs or crutches. However, wheelchairs can be undesirable for many reasons such as access. Also, not everyone is able to use crutches due to the possibility of weakness or inconvenience. Accordingly, a device known as a "knee-walker" has been developed in the past to support the injured leg while providing stability such that the individual may still move around on their own. Such knee-walkers are known from U.S. Pat. No. 4,867,188, U.S. Pat. No. 5,800,317 and U.S. Pat. No. 7,311,319. With regard to these prior art devices, they all have certain deficiencies such as the inability to steer them effectively, especially on uneven terrain, and instability. Accordingly, it is desirable to have an improved knee-walker.

BRIEF SUMMARY OF THE INVENTION

The knee-walker may also be useful for amputees.

In one aspect, the invention provides a knee-walker comprising a frame, at least two ground-engaging wheels at the front, a seat, a steering column, and a steering belt linking the steering column to the two front wheels, the two front wheels configured to be steered in response to rotation of the steering column and consequent rotation of the belt.

The knee-walker may also be known as a mobility walking support aid. Each front wheels is pivotable relative to the frame about a vertical axis.

In use, an individual may rest a knee on the seat and grasp the steering column via handlebars attached thereto to thereby steer the knee-walker. The steering belt enables no loss of steering even on uneven terrain, because both front wheels are steered simultaneously.

The term "belt" may also include other bands such as chains, ropes, cords, and similar flexible yet substantially inextensible continuous loops.

The knee-walker may further comprise belt pulley tensioners for adjusting the tension in the belt. These may take the form of pulley wheels around which the belt may fit.

The belt tensioner pulleys may change the angle of the belt by more than 90 degrees from one side of the belt tensioner to the other side. This may allow for a wrap angle of greater than 90 degrees enabling effective tensioning.

The belt may have teeth and each of the two front wheels may include toothed drive cogs for engagement by the toothed belt. Alternatively a smooth belt may be employed with no toothed cogs. The two front wheels include guides for the belt. The guides may be the toothed drive cogs. The belt may wrap around, and thus contact with, each guide for more than half of its circumference. This enables effective steering and reduces the chance of slipping especially with smooth (non-toothed) belts.

The centre of rotation of the steering column may be off-set from an imaginary line drawn between the centre of rotation of each of the front wheels. The steering column may be forward of this imaginary lines such that each front wheel is behind the steering column. This allows for a reduced turning circle. In fact, in one embodiment, the knee-walker may turn through 90 degrees with a turning circle of approximately 1027 mm.

The knee-walker may further include two rear wheels approximately at each rear corner of the frame. Each rear wheel may be fixed about a vertical axis such that each is non-pivotable about its respective vertical axis. However, in one embodiment it is possible that the rear wheels are also freely pivotable about a vertical axis.

The frame may comprise two side members extending from one end of the knee-walker to the other and a front cross member provided at one end of the two side members, the front cross member may accommodate the steering column and the two front wheels; the rear wheels may be supported on an axle arranged between the two side members at the other end of the two side members.

The side members may include a pivot about which each side member is foldable such that the rear wheels may be movable towards the front wheels so that the volume required to accommodate the knee-walker may be reducible for storage when not in use. This allows less packaging than otherwise as well as ease of storage.

The knee-walker may further comprise a handle for locking and unlocking the side members such that the side members are foldable. The handle may be lifted to unlock the side members and pushed down to lock them relative to one another. In another embodiment, the handle may be attached to a spring-biased pin cooperating directly with the pivot on one of the side members.

The seat may comprise a seat pad and a dependent seat post for adjustably fixing the seat to the frame, wherein the seat pad may be offset relative to the seat post such that it may be asymmetrical relative to the seat post so that in use the seat pad may be alignable to the left or the right of an imaginary centre line of the knee-walker for accommodating a left or right knee. In this regard, the centre line may extend from between the two front wheels to between the two rear wheels. The seat pad may thus extend more towards the right or left of the centre line.

At least some of the wheels may include suspension. This may take the form of coil springs, leaf springs or other such resilient members. The suspension may allow for a smoother "ride" for the individual which may be important to prevent jarring of the injury. It also allows for the front wheels to maintain traction with the ground at all times.

The amount of vertical "play" in the suspension may be 20 mm in one or both directions.

The steering column may include a pivot point for folding the steering column down when not in use. This may take the form of opposing teeth provided on opposing members each rotatable relative to the other one and releasably lockable to one another by means of a clamping mechanism.

The steering column may be removably attachable to the frame. This may allow it to be removed during storage. The removability may be effected, for example, by the two opposing members being completely disengagable with one another. Alternatively, or additionally, the steering column may be removably attachable from the front cross-member.

The knee-walker may include at least one brake. This may be controlled by a lever mounted on the steering column and/or the handlebars attached thereto, connected to the brake by a control wire in a similar manner to that found on bicycles.

The brakes may be rear disc brakes. The brake may be a parking brake. Alternatively a parking brake may be provided in addition to the disc brakes.

The steering column may be lockable in position such that it cannot rotate about its longitudinal axis. This may be provided by a pin extendable and retractable through a hole provided in a socket in which the steering column connects to the front cross member and a corresponding pin-receiving hole provided in the steering column. To lock the steering column the pin is extended through the hole into the pin-receiving hole such that the steering column cannot rotate relative to the socket provided on the front cross-member. However, other ways of locking the steering column are contemplated such as a clamp.

The knee-walker may be collapsible or foldable to reduce its volume during period of non-use.

The steering of both front wheels simultaneously may permit a sharp angled (for example 90 degrees) turn to be effected with no loss of stability. Steering may be more finely controlled than with only one wheel being steered, especially on slopes or uneven ground.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION OF THE INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may refer to different embodiments. Furthermore, the particular features, structures or characteristics of any embodiment or aspect of the invention may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may, in some embodiments, mean only one.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

Figure 1:
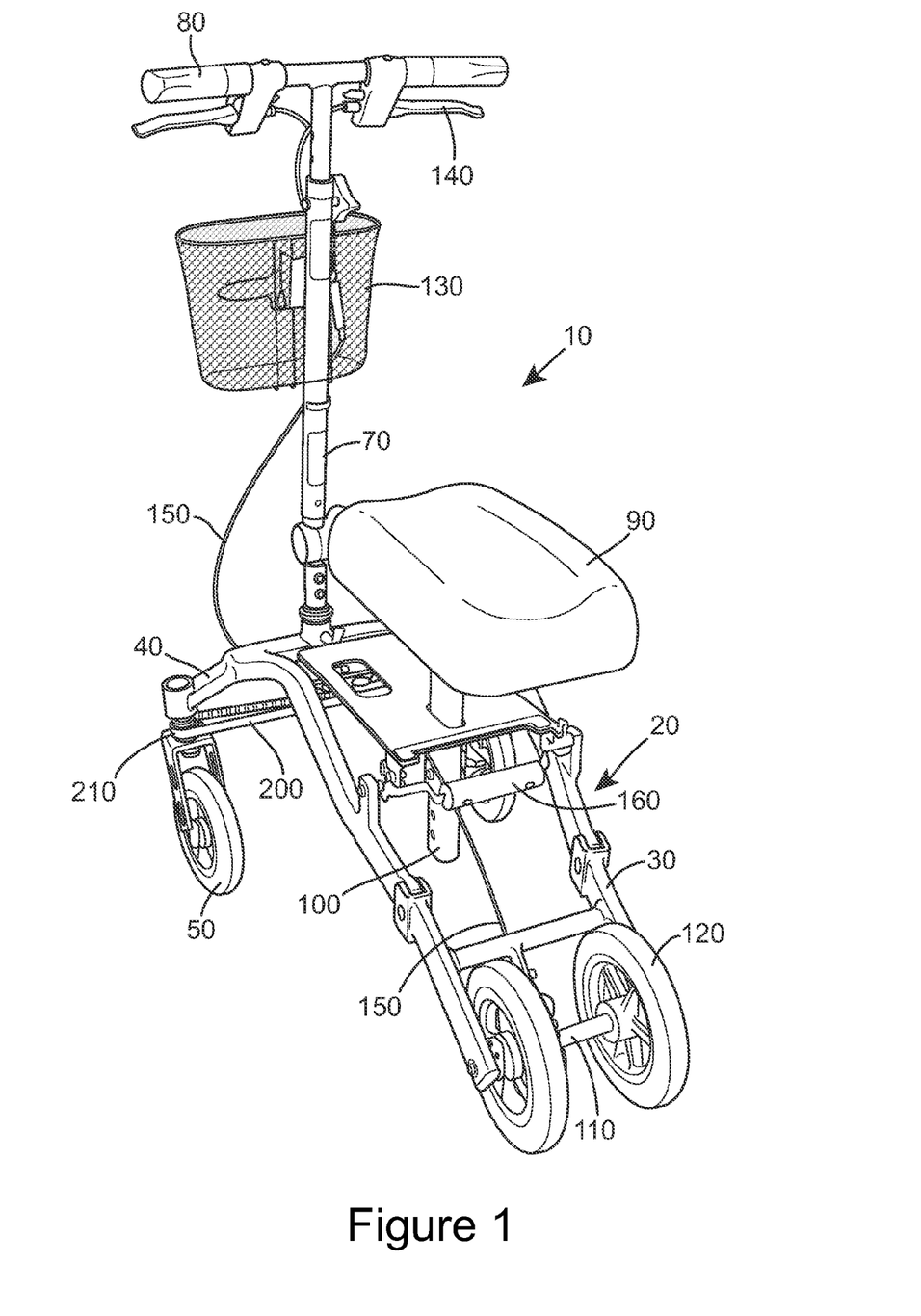
FIG. 1 is a perspective view of a knee-walker according to one embodiment of the invention.

In FIG. 1 the knee-walker 10 is shown comprising a frame 20 made of tubular bars having an oval shape cross-section. The frame 20 comprises a front cross-member 40 and two side members 30 extending rearwardly from the front cross-member 40. At the rear of the walker an axle 110 is provided on which two rear wheels 120 are arranged. The rear wheel arrangement may be such that a split bearing is provided with the axle 110.

The front cross-member 40 supports two front wheels 50 arranged at each end thereof. The front wheels 50 are pivotable to the front cross-member 40 such that they may each rotate about a respective vertical axis. Each front wheel is supported on the cross member 40 and includes a wheel pulley 210 about which a belt 200 passes. The rotation of the wheel pulley 210 induces rotation of the wheel 50. The belt 200 allows for steering of the front wheels 50 as will be described in more detail below. The front cross-member 40 includes swept-back arms at each end of a substantially straight central section. It is at the end of each of these swept-back arms that the front wheels 50 are located.

At the centre of the central section of the front cross-member 40 a steering column 70 projects upwardly.

At the top of the steering column 70 handlebars 80 are provided in the form of a "T" shape member. At each end of the handlebars 80 brake levers 140 are provided. These control brakes affect the rear wheels 120 by means of control wires 150.

A seat pad 90 is provided behind the steering column 70. The seat pad 90 has a dependent seat pad post 100 which fits into a corresponding socket 105 (refer to FIG. 2) in the frame 20. By this means the seat pad 90 may be raised and lowered to suit the individual user. Fixing of the seat post 100 relative to the socket 105 is effected by means of a knob, or resiliently biased pins, as will be readily understood.

A basket 130 is shown on the steering column 70.

A handle 160 is provided underneath and rearwardly of the seat pad 90. This handle aids collapsing or folding of the walker 10 as will be described below.

Figure 2:
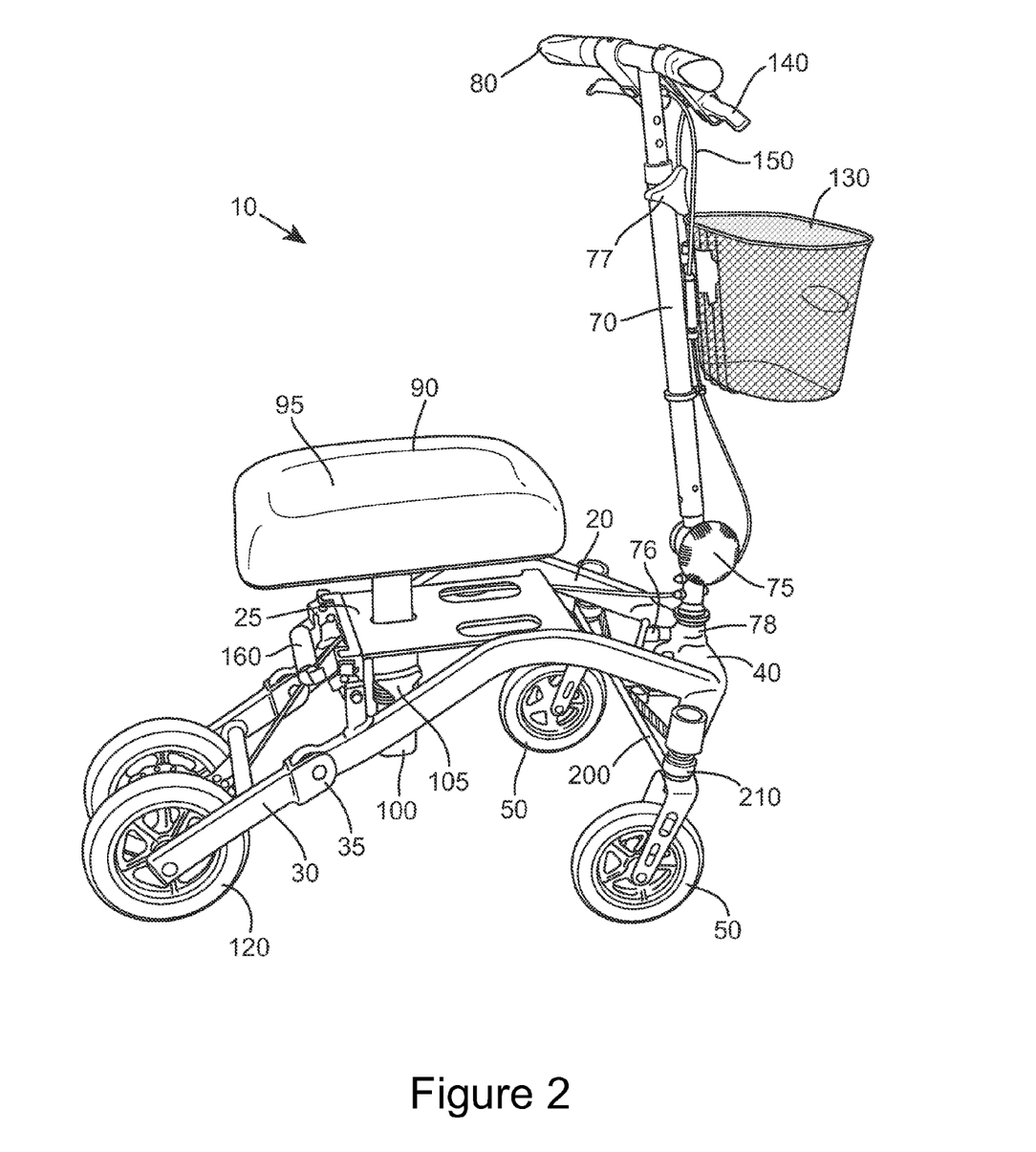
FIG. 2 is a different perspective view of the knee-walker of FIG. 1.

FIG. 2 shows the same walker 10 as FIG. 1 but from a different angle. All of the features described and referenced in FIG. 1 are the same. In addition, FIG. 2 shows a knob 77 arranged towards the top of the steering column 70. This adjustably clamps the handlebar post (which depends from the handlebars 80) within the steering column 70 and allows for the height of the handlebars 80 to be adjusted.

Further, a knob 76 is provided on the frame 20 between the two side members 30 and at the base of the steering column 70. This knob is used to lock the steering column 70 relative to the frame 20 such that the steerable wheel 60 may be maintained in a forward facing position.

The knob 76 is attached to a pin which is extendable and retractable through a hole provided in the side of a socket 78, located on the frame 20 and in which the steering column 70 sits, and a corresponding pin-receiving hole provided in the base of the steering column 70. To lock the steering column 70 the pin is extended through the hole into the pin-receiving hole such that the steering column cannot rotate relative to the socket 78 provided on the front cross-member 40.

The seat pad 90 has a groove 95 on its upper surface running from front to rear. This provides a more comfortable and secure place for the user's knee/leg to rest in use.

On the nearest shown side member 30 a pivot 35 is arranged approximately two thirds back from the front cross-member 40. This pivot 35, and a corresponding one located on the other distal side member 30, allows the frame 20 to be folded as will be described in more detail below.

The socket 105 in which the seat pad post 100 is located is visible within the frame 20 approximately mid-way between the front cross-member 40 and the rear axle 110. The socket 105 is attached to a plate 25 located between the two side members 30.

Figure 5:
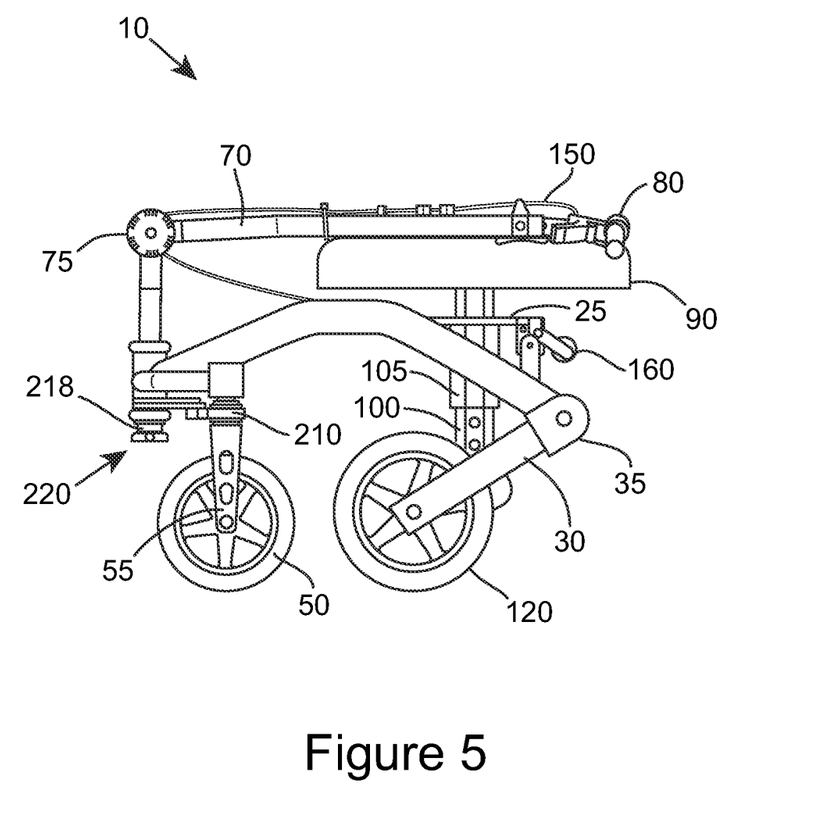
FIG. 5 is a side elevational view of the knee-walker of FIGS. 1 to 4 in a collapsed or folded state.

The handle 160 is arranged transversely of the knee-walker 10 and located behind and underneath the seat pad 90. This handle 160 enables the walker 10 to be collapsed/folded. To do this the handle 160 is grasped and lifted upwardly. This disengages a lock located between the rear edge of the plate 25 and the frame 20 such that the front and rear portions of each of the side members 30 may rotate relative to one another around the pivot 35. Refer to FIG. 5 for a view of the walker 10 in its folded position.

Figure 3:
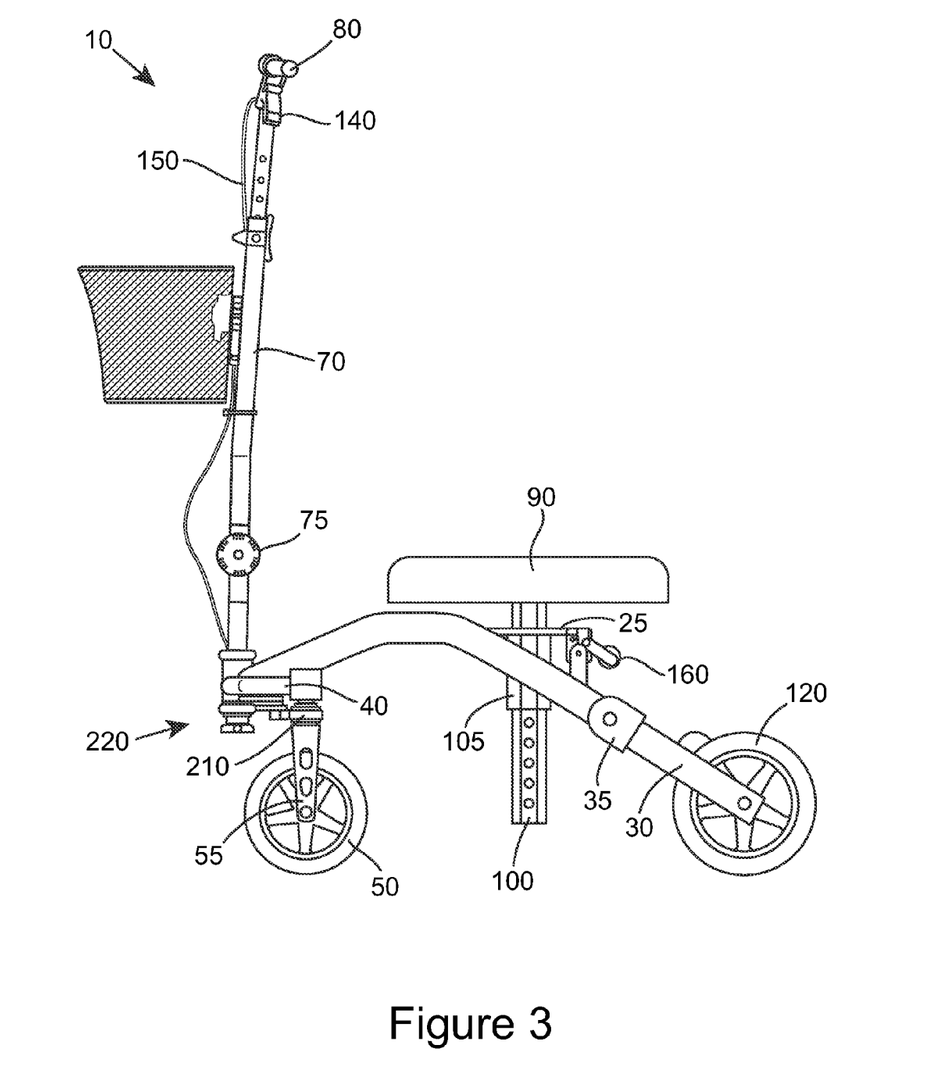
FIG. 3 is a an elevational side view of the knee-walker of FIGS. 1 and 2.

FIG. 3 shows the walker 10 from the side. The features referenced in this figure have already been described above with regard to FIGS. 1 and 2. The belt 200 is not shown in this figure for ease of understanding. One additional detail in FIG. 3 is the swept-back nature of the front wheel 50 supports 55 depending downwardly from the front cross-member 40. This swept-back arrangement aids the orientation of the front wheels 50 relative to the walker 10 as will be readily understood. Also a steering control mechanism 220 is generally indicated at the base of the steering column 70 as will be described in more detail below.

Figure 4:
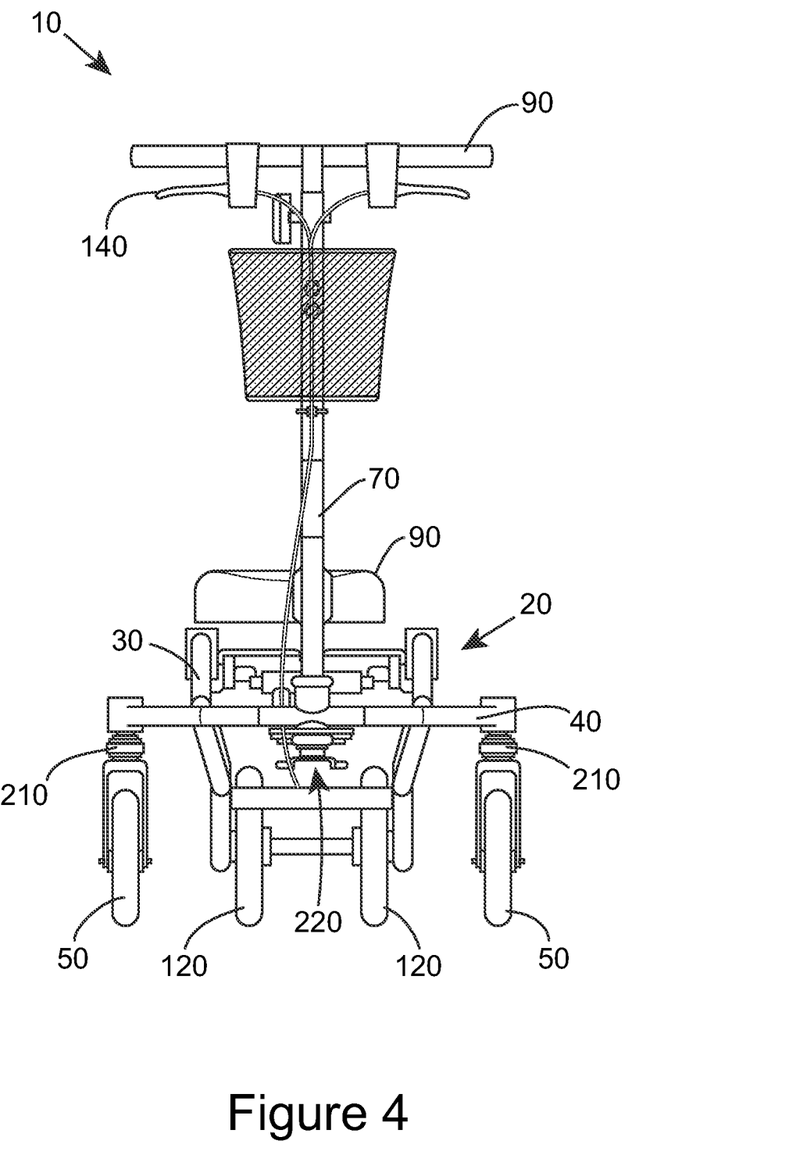
FIG. 4 is a front elevational view of the knee-walker of FIGS. 1 to 3.

FIG. 4 shows the walker 10 from the front. The features referenced in this figure have already been described above with regard to FIGS. 1 and 2. FIG. 4 is included to aid the understanding of the walker 10.

The seat pad 90 is shown in the position to accept a right knee or leg. However, the seat pad post 100 can be completely removed from the socket 105. The seat pad 90 can then be rotated 180 degrees about its vertical axis (i.e. about the length of the seat pad post 100) and then reinserted into the socket 105 such that the seat pad 90 is adapted for a left knee or leg. This is achieved because the seat pad post 100 is offset relative to the centre of the seat pad 90.

The wheel pulley 210 above each front wheel 50 is shown, as is the steering control mechanism 220 directly underneath the steering column 70. The steering belt 200 has been removed to improve clarity.

As discussed previously, the walker 10 may be folded-up. An example of this is shown in FIG. 5 where it can be seen that the rear portion of the side members 30 have been swung about pivot 35 underneath the seat pad 90 and towards the front of the walker 10. In this way, the rear wheels 120 are now located substantially underneath the seat pad 90.

Also, the steering column 70 has been pivoted about the pivot referenced "75" such that it has been laid back over the top of the seat pad 90. In this regard the seat pad 90 has been lowered to its full extent and the handlebars 80 have been retracted into the steering column 70 to their fullest extent. The basket has also been removed. In this way, the volume required to fit the walker 10 may be reduced. This is useful for storage and transportation. The overall length of the walker 10 in the folded position is approximately 533 mm, and the overall height is approximately 431 mm.

To unfold the walker 10, the rear portions of the said members are pulled around pivot 35 to their previous position and the handle 160 is then pushed down to lock them in place.

In another embodiment (not shown), instead of the handle 160 being provided under the seat pad 90, a pull-knob is provided on one of the pivots 35. The pull-knob (or handle) is connected to a pin. With the walker 10 in the unfolded state the pin extends through two aligned holes, each one provided on each part of the pivot (i.e. a part of the pivot on each section of the side member). With the pin in place in the two aligned holes the walker cannot be folded. However, when the pin is removed the two parts of the pivot may rotate relative to one another. The pin may be spring-biased and always connected to an outer part of the pivot, or could be provided on a chain and be completely removable from the pivot.

Figure 6:
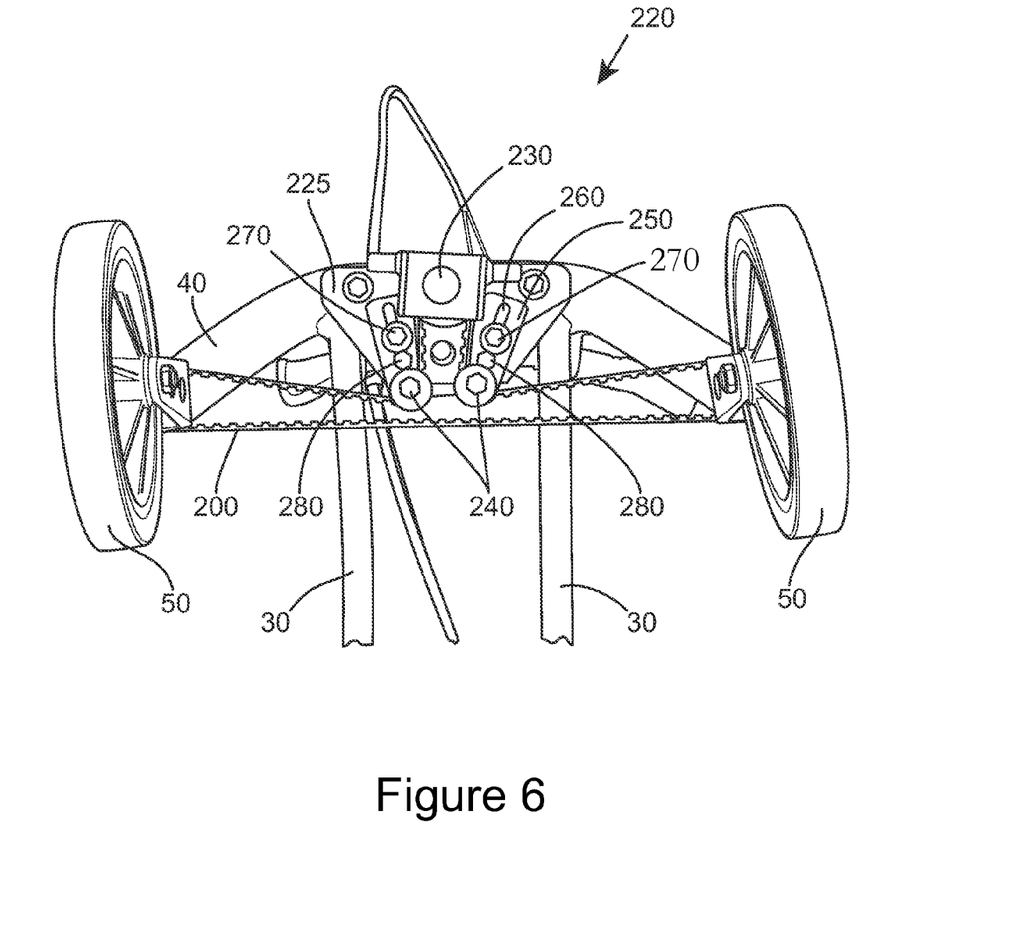
FIG. 6 is an underside view of the front of the knee-walker of FIGS. 1 to 5.

A partial underside view of the front of the walker 10 is shown in FIG. 6. Each of the two front wheels 50 are shown a respective end of the front cross-member 40; the front cross-member 40 being supported at the end of the side members 30. In the centre of the front cross-member 40 the steering control mechanism 220 is visible. This comprises of a steering column attachment 230 which allows the steering column to be retained and yet rotate relative to the front cross-member 40. A first plate 225 is attached to the underside of the cross-member 40. A second plate 250 is attached to this first plate 225 by means of bolts 270, 280. This plate has slots 260 through which these bolts 270, 280 pass. The slots 260 allow the two plates 225, 250 to be adjustably fixed relative to one another in various sliding relationship. At one end of the second plate 250 two tensioner pulleys 240 are attached.

The steering column includes a pulley 218 (refer to FIG. 5) at its basal end. The steering belt 200 passes in a loop around this steering column pulley 218, around each tensioner pulley 240 and around each wheel pulley 210. The adjustable fixing nature of the tensioner pulleys 240 allow for the steering belt to be tensioned to ensure effective steering. Steering is enabled by rotation of the steering column 70, causing rotation of the steering column pulley 218, causing rotation of the steering belt 200, causing rotation of the wheel pulleys 210, and causing rotation of the front wheels 50 in unison. The belt 200 is shown as toothed. The belt 200 may, in one embodiment (not shown) be smooth and not toothed. The various pulleys 210, 218, 240 may be toothed to cooperate with the teeth on the belt 200, or may be smooth. A combination of toothed and non-toothed pulleys 210, 218, 240 may be provided.

The walker 10 may have a relatively tight turning circle as a result of the arrangement of the front wheels. The radius of the turning circle may be equivalent to the length of the walker 10 if only the rear wheels 120 (and not any of the front wheels) are able to be dragged around.

The walker 10 may have an overall length of approximately 762 mm, and a maximum width of approximately 406 mm.

The front wheel base may have a width of approximately 394 mm, and a rear wheel base width of approximately 215 mm.

The invention claimed is:

1. A knee-walker comprising a frame, at least two ground-engaging wheels at a front portion of the frame, a seat carried by the frame, a steering column and a steering belt linking the steering column to two front wheels of the at least two ground-engaging wheels, the two front wheels configured to be steered in response to rotation of the steering column and consequent rotation of the belt, wherein the frame comprises two side members extending from a front cross member at a front portion thereof, the front cross member accommodating the steering column and the two front wheels, the at least two ground engaging wheels further comprising rear wheels supported on an axle arranged between the two side members at a rear portion of the frame, and wherein each of the two side members includes a pivot about which each side member is foldable such that the rear wheels are movable towards the front wheels so that the volume required to accommodate the knee-walker is reducible for storage when not in use.

2. The knee-walker of claim 1, further comprising belt tensioner pulleys for adjusting tension in the belt.

3. The knee-walker of claim 2, wherein the belt tensioner pulleys change an angle of the belt by more than 90 degrees from one side of the belt tensioner to the other side.

4. The knee-walker of claim 1, wherein the belt has teeth and each of the two front wheels includes toothed drive cogs for engagement by the toothed belt.

5. The knee-walker of claim 1, wherein the centre of rotation of the steering column is off-set from an imaginary line drawn between the centre of rotation of each of the front wheels.

6. The knee-walker of claim 1, further including two rear wheels approximately at each rear corner of the frame.

7. The knee walker of claim 6, wherein each rear wheel is fixed about a vertical axis such that each is non-pivotable about its respective vertical axis.

8. The knee-walker of claim 1, wherein at least some of the wheels include suspension.

9. The knee-walker of claim 1, wherein the steering column includes a pivot point for folding the steering column down when not in use.

10. The knee-walker of claim 1, wherein the steering column is removably attachable to the frame.

11. The knee-walker of claim 1, including at least one brake.

12. The knee-walker of claim 11, wherein the at least one brake is a rear disc brake.

13. The knee-walker of claim 11, wherein the brake is a parking brake.

14. The knee-walker of claim 1, wherein the steering column is lockable in position such that it cannot rotate about its longitudinal axis.

15. A knee-walker comprising a frame having opposing side members, at least two ground-engaging wheels at a front portion of the frame, a seat carried by the frame, a steering column and a steering belt linking the steering column to two front wheels of the at least two ground-engaging wheels, the two front wheels configured to be steered in response to rotation of the steering column and consequent rotation of the belt, wherein the two front wheels are pivotable relative to the frame about a substantially vertical axis, and further comprising a handle for locking and unlocking the side members such that the side members are foldable.

16. A knee-walker comprising a frame, at least two ground-engaging wheels at a front portion of the frame, a seat carried by the frame, a steering column and a steering belt linking the steering column to two front wheels of the at least two ground-engaging wheels, the two front wheels configured to be steered in response to rotation of the steering column and consequent rotation of the belt, wherein the seat comprises a seat pad and a dependent seat post for adjustably fixing the seat to the frame, and wherein the seat pad is offset relative to the seat post such that it is asymmetrical relative to the seat post so that in use the seat pad is alignable to the left or the right of an imaginary centre line of the knee-walker for accommodating a left or right knee.

* * * * *